United States Patent
Rohweller et al.

(10) Patent No.: US 10,131,452 B1
(45) Date of Patent: Nov. 20, 2018

(54) INTEGRATED TELESCOPIC BOOM AND LARGE DEPLOYABLE REFLECTOR

(71) Applicant: NORTHROP GRUMMAN SYSTEMS CORPORATION, Falls Church, VA (US)

(72) Inventors: David J. Rohweller, Ojai, CA (US); Geoffrey W. Marks, Santa Barbara, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/934,905

(22) Filed: Mar. 23, 2018

(51) Int. Cl.
*B64G 1/22* (2006.01)
*H01Q 1/12* (2006.01)
*H01Q 1/28* (2006.01)

(52) U.S. Cl.
CPC ........... *B64G 1/222* (2013.01); *H01Q 1/1235* (2013.01); *H01Q 1/288* (2013.01)

(58) Field of Classification Search
CPC ...... B64G 1/222; H01Q 1/1235; H01Q 1/288; F16M 11/32; F16M 11/28; F16M 11/04; F16B 7/105; F21V 21/14; F21V 21/22; A47B 2200/0051; A47C 3/40
See application file for complete search history.

(56) References Cited

U.S. PATENT DOCUMENTS

| 4,562,441 | A | * | 12/1985 | Beretta | H01Q 1/288 343/781 P |
| 5,052,645 | A | * | 10/1991 | Hixon | H01Q 1/1235 248/125.2 |
| 5,315,795 | A | * | 5/1994 | Chae | B66F 11/00 343/874 |
| 5,680,145 | A | | 10/1997 | Thomson et al. | |
| 2005/0061933 | A1 | * | 3/2005 | Barth | F16M 13/04 248/178.1 |
| 2008/0111031 | A1 | * | 5/2008 | Mobrem | B64G 1/222 244/172.6 |
| 2013/0239490 | A1 | * | 9/2013 | Peng | E04B 1/34305 52/111 |

* cited by examiner

*Primary Examiner* — Philip J Bonzell
*Assistant Examiner* — Tye William Abell
(74) *Attorney, Agent, or Firm* — John A. Miller; Shumaker, Loop & Kendrick, LLP

(57) ABSTRACT

A telescopic boom and reflector assembly for a spacecraft that includes a telescopic boom having a plurality of boom sections that are nested together within a prime batten or where the prime batten is attached to an outermost section of the boom when the boom is in a stowed position, where an innermost and smallest diameter section of the boom is secured to the spacecraft to facilitate testing and integration of the boom and reflector as a unitized assembly. The assembly also includes a reflector having a truss structure configured to allow the reflector to be collapsed into a stowed configuration, where the reflector is mounted to the prime batten. The assembly is configured to be deployed from the spacecraft by releasing the boom in a telescopic manner where the boom sections increase in diameter from the spacecraft outward when the boom is deployed.

16 Claims, 3 Drawing Sheets

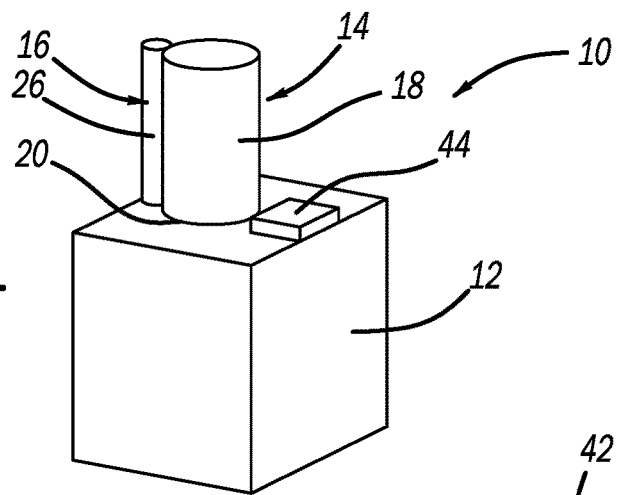
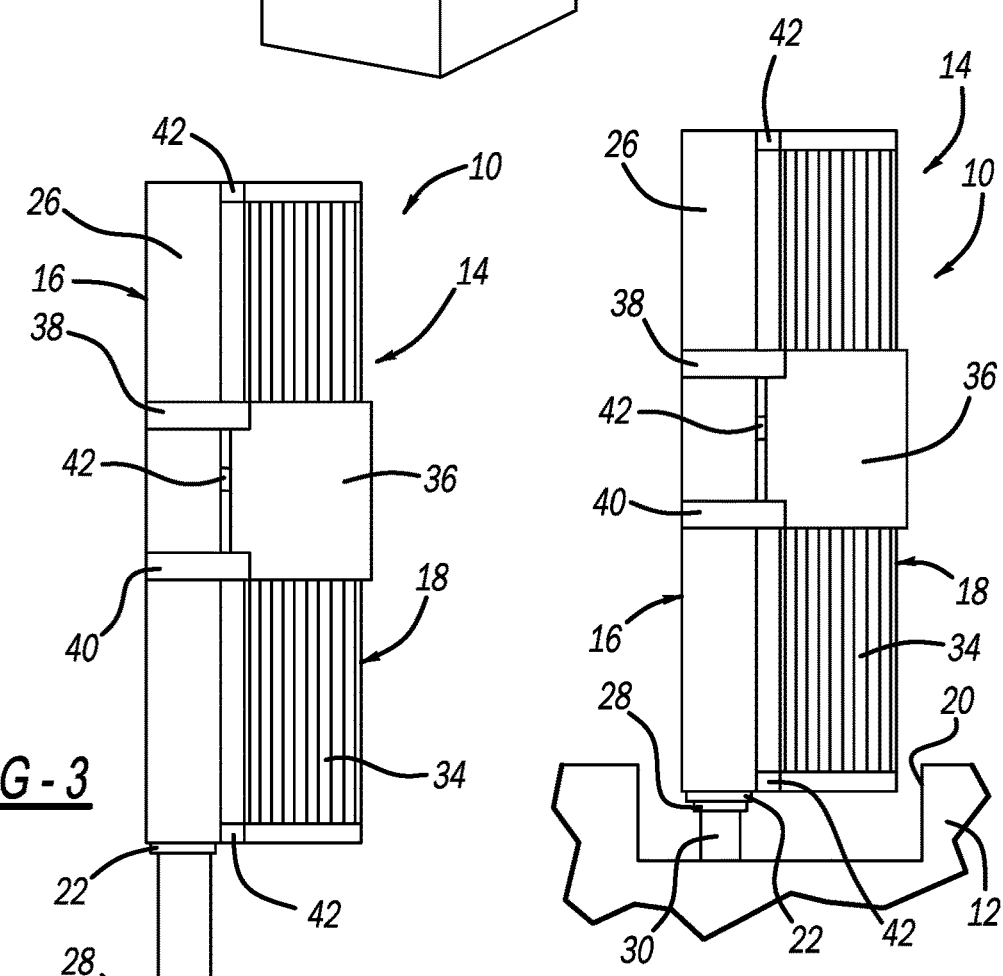

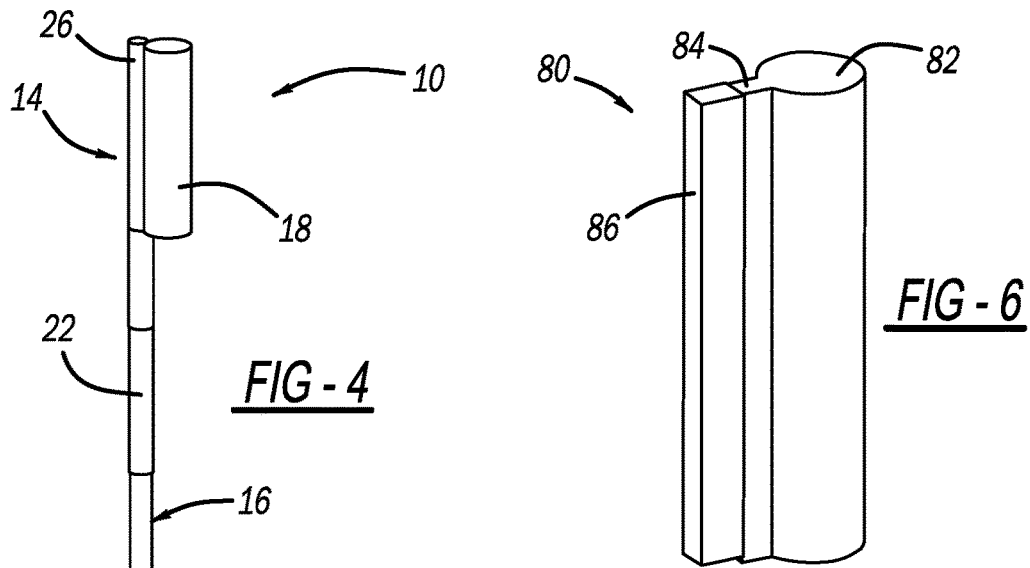
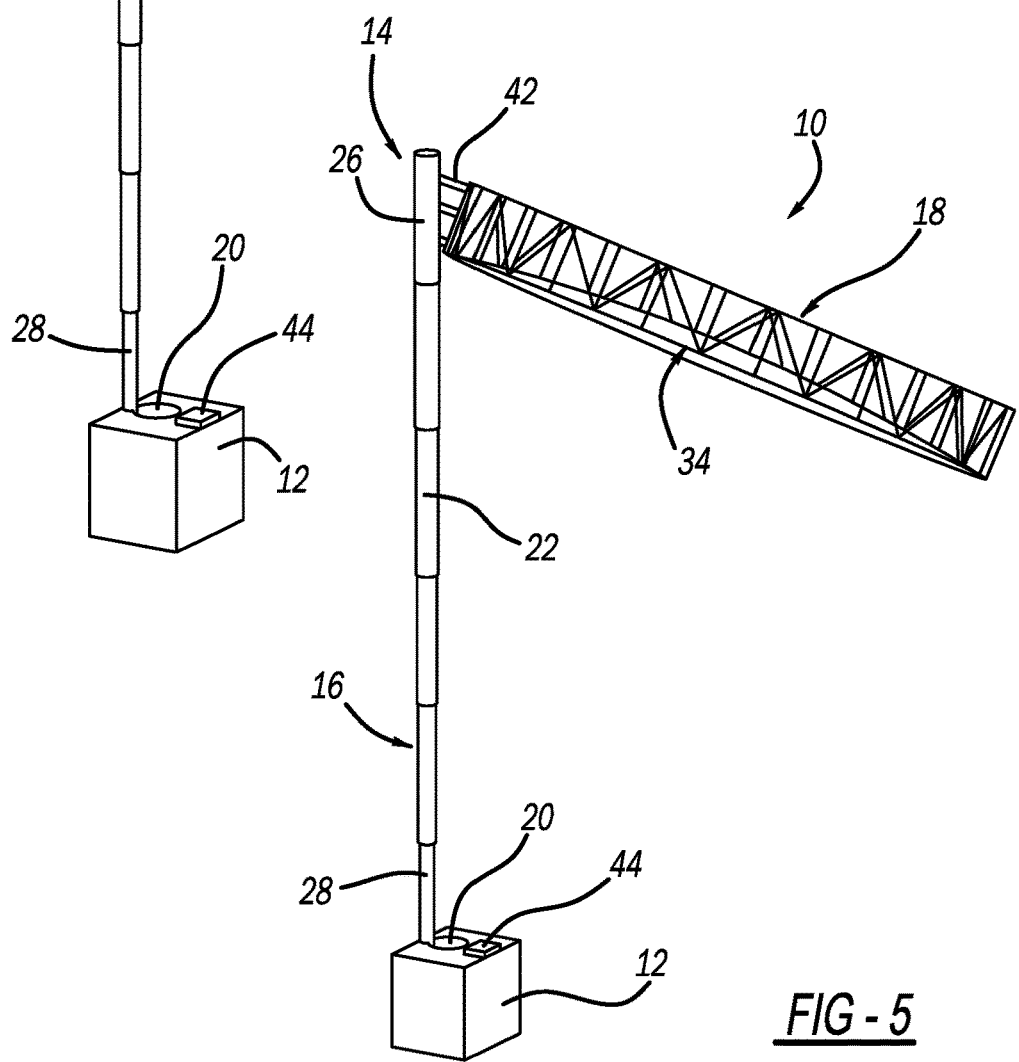

INTEGRATED TELESCOPIC BOOM AND LARGE DEPLOYABLE REFLECTOR

BACKGROUND

Field

This disclosure relates generally to a telescopic boom and reflector assembly deployable from a spacecraft and, more particularly, to a telescopic boom and reflector assembly deployable from a spacecraft, where the boom includes several boom sections that are nested together in a stowed configuration such that an innermost section is coupled to the spacecraft and the reflector is coupled to an outermost section.

Discussion

Spacecraft sometimes employ various types of devices, such as reflectors, antenna arrays, sensors, etc., that must be deployed from the spacecraft on a boom when the spacecraft is on orbit or in space. Known booms for this purpose typically employ support rods coupled together by hinges that allow the boom to be folded or stowed in the spacecraft envelope or fairing during launch, and then be unfolded in space to the deployed position. Various devices and techniques are known in the art for unfolding or deploying a boom, including the use of motors, preloaded springs and various types of actuators.

For certain types of spacecraft, such as communications satellites in geostationary orbit, large reflectors are often employed to collect receive signals, such as a satellite uplink signal, and direct those signals to a transceiver on the spacecraft, and direct transmit signals, such as a satellite downlink signal, from the transceiver on the spacecraft towards a receiver. These types of reflectors are collapsed into a stowed configuration during satellite launch, and then unfurled on a suitable truss structure and extended by a boom once the spacecraft is in position on orbit. The performance of various types of communications and other satellites can often be improved by increasing the size of the reflector, which requires longer booms to extend the reflector farther from the spacecraft. However, the size of the available spacecraft stowage space typically acts to limit the size of the reflector and deployment booms, primarily the length and stiffness of the booms for those types of booms having hinged sections.

Telescopic booms are also known for deploying satellite reflectors that include a number of boom sections having gradually decreasing diameters that are nested inside of each other and deployable in a telescoping manner. In one configuration, the boom sections include a root section in which the other sections are stowed and that is rotated away from the spacecraft on a root hinge when the reflector is being deployed. The reflector is mounted to an exposed tip of the innermost and smallest diameter section. When the root section is released from the spacecraft, the reflector can be unfurled or deployed prior to or after the telescopic boom sections are deployed and extended. However, because the reflector is only able to be mounted to the tip of the innermost section there is a limit as to how the reflector can be positioned and deployed because of the limited area that the reflector can be attached to.

BRIEF DESCRIPTION OF THE DRAWINGS

FIG. 1 is an isometric view of a spacecraft including a stowed telescopic boom and reflector assembly;

FIG. 2 is a broken-away side view of the spacecraft showing the telescopic boom and reflector assembly in a stowed configuration;

FIG. 3 is a broken-away side view of the spacecraft showing the telescopic boom partially deployed and the reflector assembly stowed;

FIG. 4 is an isometric view of the spacecraft showing the telescopic boom being deployed and the reflector stowed;

FIG. 5 is an isometric view of the spacecraft showing the telescopic boom and reflector assembly being fully deployed;

FIG. 6 is an isometric view of a stowed telescopic boom and reflector assembly separated from the spacecraft where an outer section of the boom is attached to a prime batten;

DETAILED DESCRIPTION OF THE EMBODIMENTS

Figures 7, 8:
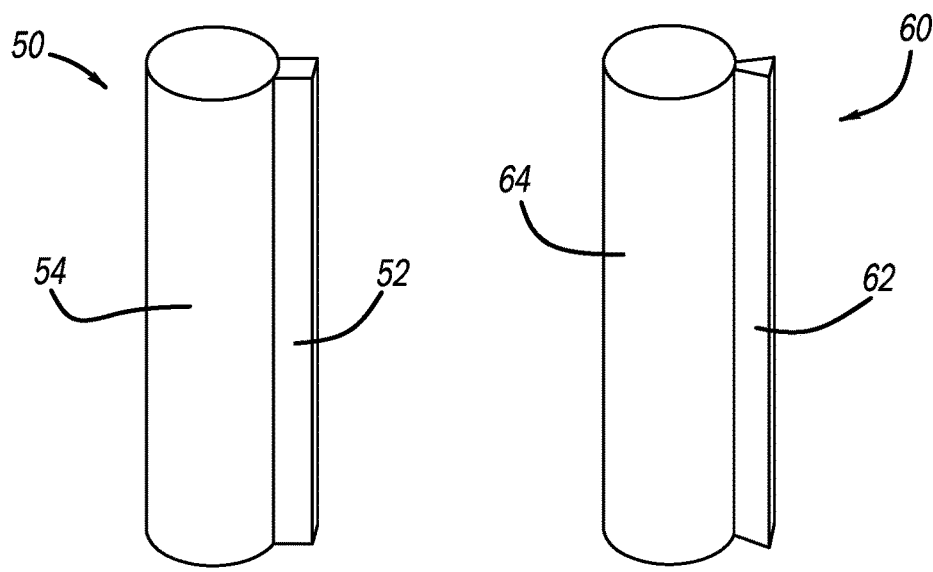
FIG. 7 is an isometric view of a stowed telescopic boom and reflector assembly separated from the spacecraft where the boom is rectangular.
FIG. 8 is an isometric view of a stowed telescopic boom and reflector assembly separated from the spacecraft where the boom is trapezoidal.

The following discussion of the embodiments of the disclosure directed to a telescopic boom and reflector assembly is merely exemplary in nature, and is in no way intended to limit the disclosure or its applications or uses.

FIG. 1 is an isometric view of a spacecraft 10 including a spacecraft body 12 and a boom and reflector assembly 14 having a telescopic boom 16 and a reflector 18, where the assembly 14 is shown in its fully stowed configuration. The spacecraft 10 is intended to represent any spacecraft suitable for the purposes discussed herein, such as a communications or radar satellite. Although the spacecraft body 12 is shown as being square, the body 12 can have any suitable shape and size within the scope of the present disclosure. The stowed assembly 14 is positioned within suitably configured openings 20 within the spacecraft body 12 prior to deployment. FIG. 2 is a broken-away side view of the spacecraft 10 showing the stowed boom and reflector assembly 14, FIG. 3 is a broken-away side view of the spacecraft 10 showing the boom and reflector assembly 14 being partially deployed, FIG. 4 is an isometric view of the spacecraft 10 showing the telescopic boom 16 being deployed and the reflector 18 being stowed, and FIG. 5 is an isometric view of the spacecraft 10 showing the boom and reflector assembly 14 being fully deployed.

As will be discussed in detail below, the boom 16 includes a number of tubular boom sections 22 having gradually decreasing diameters that are nested inside of each other and deployable in a telescoping manner, where an innermost and smallest diameter section 28 is coupled to the spacecraft body 12 and an outermost and largest diameter section 24 extends the farthest from the spacecraft body 12 when the boom 16 is deployed. The sections 22 of the boom 16 are made of a suitable material, such as a graphite-epoxy composite, and have a suitable stiffness so that they are able to support the reflector 18 in a deployed position some distance from the spacecraft body 12. The boom 16 can have any number of the sections 22 for a particular application. In one non-limiting embodiment, the boom 16 includes ten sections 22 each being approximately ten feet long to provide a 100 foot boom. However, it is noted that the size of the assembly 14 is limited by the space available on the spacecraft 10. The boom 16 includes a prime batten 26 having a larger diameter than the largest diameter of the sections 22 and that houses all of the sections 22 of the boom 16 in a nested configuration when the boom 16 is stowed. The innermost section 28 is secured to a motor driven storable tubular extendable member (STEM) drive mechanism 30, known to those skilled in the art, that is mounted to the spacecraft body 12 and is operable to extend and deploy the boom 16 in a telescopic manner.

In an alternate embodiment, the prime batten 26 can be attached to the outermost section 22. This embodiment is illustrated in FIG. 6 showing an isometric view of a telescopic boom and reflector assembly 80 separated from the spacecraft and shown in the stowed configuration. The assembly 80 includes a prime batten 82 secured to a reflector 84 and that is coupled to an outer most section 86 of a boom, where the other boom sections are stowed in the outer section 86.

Because the innermost section 28 of the boom 16 is secured to the spacecraft body 12 the entire length of the outermost tube section 22 or the prime batten 26 is available to secure the reflector 18 thereto instead of just the tip of the innermost section as was necessary in the known telescopic booms. In this embodiment, a truss structure 34 of the reflector 18 is held within a cradle 36 when the reflector 18 is collapsed into a stowed configuration and is secured to the outermost tube section 22 or prime batten 26 by straps 38 and 40, where the straps 38 and 40 can be provided at any suitable location along the length of the outermost tube section 22 or the prime batten 26. The reflector 18 is rigidly secured to the batten 26 by struts 42 when the reflector 18 is stowed and deployed, where the struts 42 also can be provided at any suitable location along the length of the batten 26.

In one non-limiting embodiment for extending the boom 16, the prime batten 26 is released by, for example, a pyro-actuated device (not shown) and the motor driven STEM drive mechanism 30 pushes the batten 26 out of and away from the spacecraft body 12 so that the boom sections 22 are extended therefrom in a telescoping manner, and the boom 16 is deployed. In one non-limiting embodiment, the deployment of the boom 16 using the STEM drive mechanism 30 is in the manner or similar manner as discussed in U.S. Pat. No. 5,315,795 issued May 31, 1994 to Chae et al., where the sections 22 are coupled together by spring-loaded and retractable pins (not shown). FIG. 4 shows the boom 16 completely extended where the boom sections 22 get progressively larger in diameter from the spacecraft body 12 to the collapsed reflector 18 to allow the nesting configuration of the boom 16.

Once the boom 16 has been extended, the reflector 18 is released from the cradle 36 by, for example, a pyro-actuated device (not shown). Once the reflector 18 has been released from the cradle 36 it is actuated by a suitable actuation mechanism (not shown) that allows the truss structure 34 to be expanded by, for example, a motor drive cable within the truss structure 34 so that the reflector 18 is properly oriented relative to a transceiver module 44 on the spacecraft body 12, as shown in FIG. 5. The reflector 18 can have any suitable size or shape for a particular application, such as round or elliptical. One suitable truss structure and reflector of this type can be found in U.S. Pat. No. 5,680,145 issued Oct. 21, 1997 to Thomson et al., although many other types will be applicable.

The assembly 14 as discussed herein describes a palletized structure where the boom 16, the reflector 18 and the prime batten 26 are an integrated structure that allows the assembly 14 to be assembled and then easily tested before being attached to the spacecraft 10 as a single unit. This feature allows multiple attachments to be easily and quickly secured to the spacecraft 10 during spacecraft assembly.

The prime batten 26 and the boom sections 22 are tubular in the above described non-limiting embodiment. As used herein, tubular can mean any tube shape, such as circular, octagonal, square, rectangular, hexagonal, etc. For example, in other embodiments, the telescopic boom 16 can have other shapes that may be suitable for various applications depending on various things, such as desired boom stiffness, boom length, stowing volume, weight, etc. To illustrate this, FIG. 7 is an isometric view of a telescopic boom and reflector assembly 50 separated from the spacecraft and shown in the stowed configuration. The assembly 50 includes a prime batten 52 that houses the boom sections and a reflector 54 coupled to the batten 52, where the batten 52 and the boom sections have a rectangular shape. FIG. 8 is an isometric view of a telescopic boom and reflector assembly 60 separated from the spacecraft and shown in the stowed configuration. The assembly 60 includes a prime batten 62 that houses the boom sections and a reflector 64 coupled to the batten 62, where the batten 62 and the boom sections have a trapezoidal shape. Other shapes, such as triangular, may also be applicable.

Figure 9:
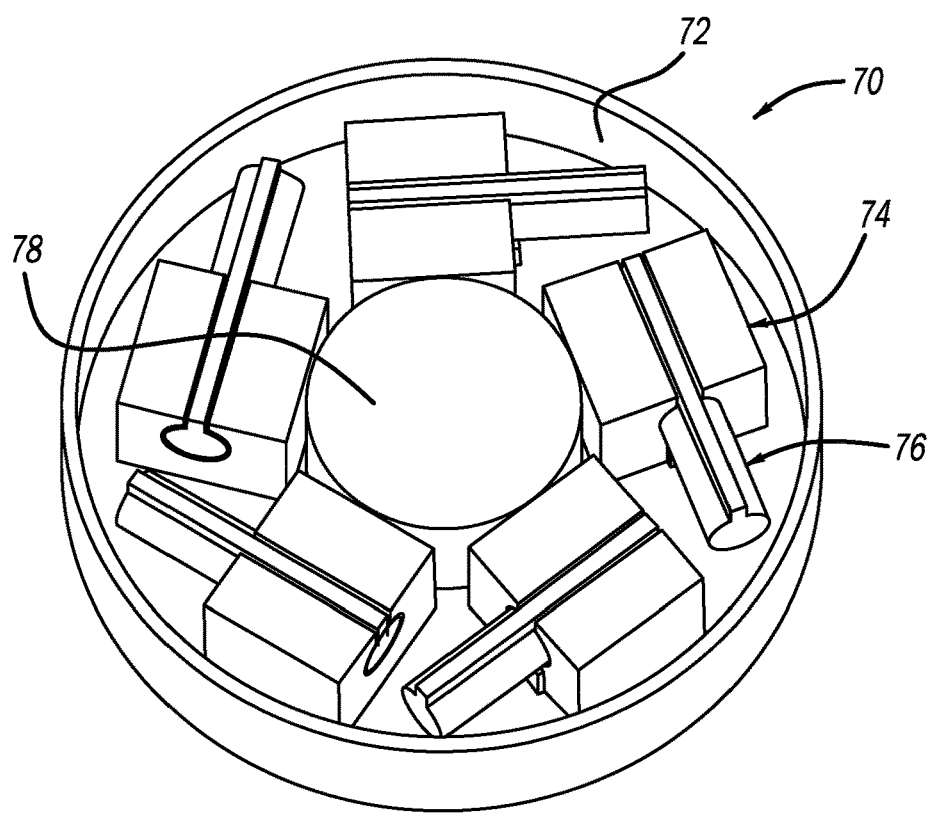
FIG. 9 is a broken-away isometric view of a launch vehicle showing five spacecraft each including a stowed telescopic boom and reflector assembly and being coupled to an evolved expendable launch vehicle (EELV) secondary payload adaptor (ESPA) ring.

As mentioned, the spacecraft 10 can have any suitable size and shape for a particular application. For example, in one embodiment, the spacecraft 10 is a relatively small communications satellite having a single antenna. It is known in the art to launch satellites of this type in combination with several other small satellites and along with a larger payload to save costs. For this type of application, the spacecraft 10 needs to fit within a small launch volume. FIG. 9 is a broken-away isometric view of a launch vehicle 70 including a fairing 72 in which is positioned five satellites 74 each including a stowed boom and reflector assembly 76 and being similarly configured to the spacecraft 10. The satellites 74 are releasably coupled to an ESPA ring 78 at a center of the fairing 72 and must be of a limited size to fit within the available fairing volume. A rocket (not shown) would be mounted to one side of the fairing 72 and a larger payload (not shown) would be mounted to an opposite side of the fairing 72. After the launch vehicle 70 is launched, the satellites 74 are systematically released from the ring 78 when the vehicle 70 is at the desired location on orbit.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A boom and reflector assembly for a spacecraft, said assembly comprising:
 a telescopic boom including a plurality of boom sections that are nested together within an outer boom section when the boom is in a stowed position, wherein an innermost and smallest diameter section of the boom is secured to the spacecraft;
 a reflector including a truss structure that allows the reflector to be collapsed into a stowed configuration, said reflector being mounted to a structure, said structure being secured to the boom, wherein the assembly is configured to be deployed from the spacecraft by releasing the boom in a telescopic manner where the boom sections increase in diameter from the spacecraft outward when the boom is deployed; and said plurality of boom sections are provided within said structure when the boom is in the stowed position.

2. The assembly according to claim 1 wherein the structure is secured to an outermost boom section.

3. The assembly according to claim 1 wherein the boom, the reflector and the structure are configured as a single unit palletized structure.

4. The assembly according to claim 1 wherein the boom sections have a trapezoidal shape.

5. The assembly according to claim 4 wherein the boom sections have a tubular shape.

6. The assembly according to claim 4 wherein the reflector is mounted along an entire length of the outer structure.

7. The assembly according to claim 4 wherein the reflector is secured to the outer structure in the stowed configuration by a cradle and straps.

8. The assembly according to claim 4 wherein the boom sections are extended in the telescopic manner by a motor driven storable tubular extendable member (STEM) drive mechanism.

9. A boom and reflector assembly for a spacecraft, said assembly comprising:

a telescopic boom including a plurality of boom sections that are nested together within a structure when the boom is in a stowed position, said structure being secured to the boom, wherein an innermost and smallest diameter section of the boom is secured to a motor driven storable tubular extendable member (STEM) drive mechanism mounted to the spacecraft; and a reflector including a truss structure that allows the reflector to be collapsed into a stowed configuration, said reflector being positioned within a cradle when it is in the stowed configuration and mounted to the structure by straps, wherein the assembly is configured to be deployed from the spacecraft by releasing the boom in a telescopic manner using the STEM drive mechanism where the boom sections increase in diameter from the spacecraft outward when the boom is deployed, and wherein the reflector is deployed after the cradle is released.

10. The assembly according to claim 9 wherein the boom sections have a trapezoidal shape.

11. The assembly according to claim 9 wherein the boom sections have a tubular shape.

12. The assembly according to claim 9 wherein the reflector is mounted along an entire length of the structure.

13. A method for deploying a boom and reflector assembly for a spacecraft, said assembly including a telescopic boom having a plurality of boom sections that are nested together when the boom is in a stowed position, wherein an innermost and smallest diameter section of the boom is secured to the spacecraft, and a reflector including a truss structure that allows the reflector to be collapsed into a stowed configuration, said reflector being mounted to a structure, said structure being secured to the boom, said plurality of boom sections provided within said structure when the boom is in the stowed position, said method comprising:

extending the boom in a telescopic manner so that the boom sections get increasingly larger in diameter the farther they are away from the spacecraft; and deploying the reflector.

14. The method according to claim 13 wherein the structure is secured to an outermost boom section.

15. The method according to claim 13 wherein the boom, the reflector and the structure are configured as a single unit palletized structure.

16. The method according to claim 13 wherein the boom sections are extended in the telescopic manner by a motor driven storable tubular extendable member (STEM) drive mechanism.

* * * * *